Jan. 16, 1962 W. B. WESTCOTT, JR 3,017,170
TEMPERATURE COMPENSATED LIQUID SPRING
Filed March 27, 1959

INVENTOR.
WILLIAM B. WESTCOTT, JR.
BY
ATTORNEY

United States Patent Office 3,017,170
Patented Jan. 16, 1962

3,017,170
TEMPERATURE COMPENSATED
LIQUID SPRING
William B. Westcott, Jr., Cleveland Heights, Ohio, assignor to Cleveland Pneumatic Industries, Inc., Cleveland, Ohio, a corporation of Ohio
Filed Mar. 27, 1959, Ser. No. 802,390
9 Claims. (Cl. 267—1)

This invention relates to liquid springs and more particularly to a new and improved liquid spring having means to compensate for temperature variations.

It is an important object of this invention to provide a liquid spring incorporating a temperature compensating mechanism which insures uniform operation when the liquid spring temperature changes.

It is another important object of this invention to provide a liquid spring in combination with a mechanical spring arranged to provide uniform spring operation when the temperature of the liquid spring changes.

It is still another object of this invention to provide a combination including a liquid spring and a flat rate mechanical spring which co-operates to insure uniform operation at least at one point in the spring stroke when the temperature of the liquid spring varies.

Further objects and advantages will appear from the following description and drawings, wherein.

Figure 1:
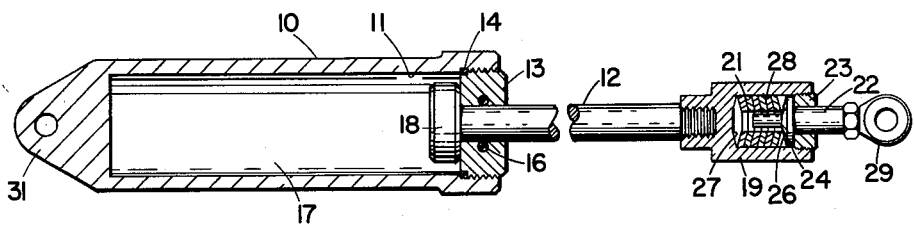
FIGURE 1 is a longitudinal section of a preferred liquid spring according to this invention showing the elements in the extended position.

Liquid springs have an advantage of providing high energy absorbing capacity with a small lightweight structure. Generally, the liquid spring includes a cylinder in which a plunger is axially movable to change the volume of a chamber defined by the plunger and chamber. This chamber is completely filled with liquid which is compressed by inward movement of the plunger to provide a resilient spring device. In many installations, liquid springs are not satisfactory, however, since they are sensitive to temperature variations. If liquid is heated, it expands due to its co-efficient of expansion changing the load stroke characteristics of the spring. Conversely, when it is cooled, the liquid contracts again changing the load stroke characteristics. In some installations, it is necessary to provide a spring device which will provide a load stroke relationship which passes through a predetermined point regardless of the temperature of the spring. A liquid spring according to this invention includes a compensating mechanism which insures that the load stroke curve will provide a predetermined load in a predetermined stroke position regardless of the temperature of the spring.

The illustrated liquid spring incorporating this invention includes a cylinder 10 formed with an axial bore 11. The plunger 12 projects into the open end of the bore 11 and a gland nut 13 threaded into the cylinder 10 provides a fluid seal and bearing support between the cylinder 10 and the plunger 12. A static seal 14 prevents leakage along the joint between the gland nut 13 and cylinder 10 and a dynamic seal 16 provides sealing between the gland nut 13 and plunger 12. The cylinder 10, gland nut 13, and plunger 12 co-operate to define a chamber 17 the volume of which is reduced by axial movement of the plunger 12 into the cylinder 10 and increased by relative movement in the opposite direction.

The chamber 17 is completely filled with liquid precharged to a predetermined pressure when the plunger is in the fully extended position of FIGURE 1 so that movement of the plunger to any position spaced from the fully extended position produces compression of the liquid and an increase in the reaction force urging the plunger to the right. The force urging the plunger 12 to the right is equal to the cross sectional area of the plunger times the pressure of the liquid in any given position of the stroke. A head 18 is formed on the inner end of the plunger 12 and proportioned to engage the gland nut 13 when the plunger is in the fully extended position to limit movement of the plunger in the extending position.

Mounted on the outer end of the plunger 12 by a threaded connection is a housing 19 formed with an axial bore 21. An end member 22 extends into the bore 21 through a nut 23 threaded into the outer end of the bore 21. Within the bore 21, the end member 22 is formed with a radial flange 24 providing a conical surface 26. The inner end of the bore 21 terminates in a conical wall 27 similar to the conical surface 26. Positioned between the conical surface 26 and conical wall 27 are a series of conical or Belleville type springs 28. These springs operate to resiliently urge the flange 24 into engagement with the nut 23 with a predetermined preload. When a force is developed urging the end member 22 to the left relative to the spring housing 19 greater than the predetermined preload, the springs 28 are compressed to the position shown in FIGURE 2. The springs 28 are designed so that the compression from the position of FIGURE 1 to the position of FIGURE 2 occurs essentially at a constant load. Therefore, the springs have to be designed so that they have a flat or zero spring rate in the range of compression between these two positions. In order to provide means for connecting the spring to its associated load, the end member 22 is formed with a mounting portion 29 and the cylinder 10 is provided with a mounting portion 31.

In effect, this spring combination includes a liquid spring having a relatively long compression stroke in series with a short stroke zero rate mechanical spring. As the two mounting portions 29 and 31 are moved toward each other by the connected load, the plunger 12 initially moves into the cylinder 10 and there is no relative movement between the end member 22 and the plunger 12. When the reaction load developed by the liquid on the plunger 12 reaches a predetermined value equal to the preload on the springs 28, the mechanical springs 28 are compressed to the fully compressed position. At this point in the stroke of the overall spring, the plunger 12 is stationary relative to the cylinder 10 and the end member 22 moves in relative to the plunger 12 compressing the springs 28. Once the mechanical springs 28 are fully compressed, additional movement of the two mounting portions 29 and 31 toward each other produces movement of the plunger 12 relative to the cylinder 10 and further compression of the liquid.

Figure 3:
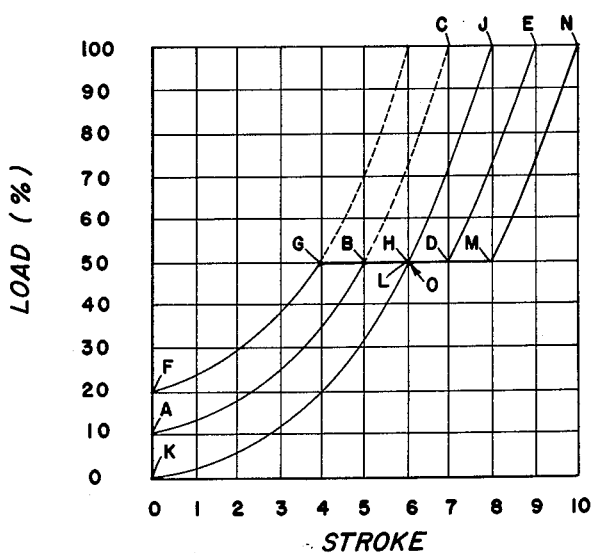
FIGURE 3 is a load stroke diagram illustrating the operation of the liquid spring incorporating this invention.

The operation of the spring under different temperature conditions is illustrated in FIGURE 3. The curve AB illustrates the compression of the liquid part of the spring under normal design temperatures. When the spring is in the fully extended position at A, the load or force urging the plunger 12 toward the fully extended position is determined by the precharge pressure. As the plunger 12 moves in relative to the cylinder 10, the load or reaction on the plunger 12 follows the curve AB. If the mechanical springs 28 were not provided in series with the liquid spring, the full stroking would result in a load stroke curve from A to C. However, at the point B, the predetermined preload on the springs 28 is reached and the springs 28 are compressed at substantially constant load to the point D. When the point D is reached, the springs 28 are fully compressed and additional compressing stroke again compresses the liquid causing the total spring to be compressed up along the curve from D to E. It can be seen that the liquid spring is compressed from A to B, the mechanical spring 23 is compressed from D to E, and the liquid spring is further compressed from D to E.

If the temperature of the liquid is increased above the normal design temperature, the liquid expands due to its co-efficient of expansion and increases the precharge pressure so that the initial force urging the plunger 12 to the right is indicated by the point F. Therefore, compression produced by movement of the two mounting portions 29 and 31 toward each other causes compression along the curve from F to G. Since the mechanical springs 28 are essentially insensitive to pressure changes, the mechanical spring starts to compress at the same force regardless of the temperature so the mechanical spring is compressed from G to H. Additional compression of the device causes the liquid spring to be compressed from H to J. If the temperature of the liquid is reduced below the normal design temperature, the precharge will be at the point indicated at K. In this case, compression of the spring will be along the curve KL and compression of the mechanical spring will be along the line from L to M. Further compression of the liquid spring will be along the curve MN. An analysis of the three curves will show that all three load stroke curves pass through the point O. Therefore, the desired load stroke relationship at the point O is provided regardless of the temperature of the liquid within the design range of the system.

Figure 2:
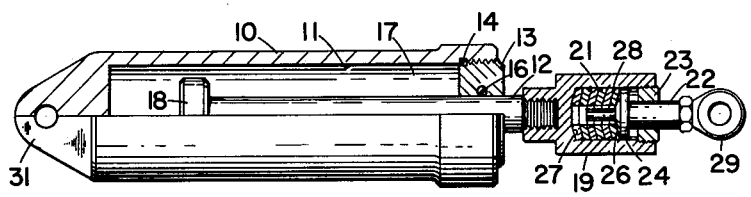
FIGURE 2 is a view similar to FIGURE 1 showing the elements in the compressed position.

It is necessary for the stroke of the springs 28 to be at least equal to the displacement of stroke of the liquid spring through the entire design temperature range. On the curves in FIGURE 3, the horizontal displacement between the points G and L represents the maximum displacement of stroke from the upper design temperature to the lower design temperature and this is equal to the compression stroke of the springs 28. If compensation must be provided at still a second level, it is possible to add a second mechanical spring in series with the springs 28 and the liquid spring designed to be compressed at the second desired compensated load. It is recognized that full compensation will not be provided throughout the entire range of the stroke but in many installations, such compensation is not required and the structure provided will produce a composite spring action which is compensated for temperature variations at at least one point in the spring stroke. The conical or Belleville type springs have the advantage of providing a very high spring force with a relatively small structure through a small stroke which is ideal for this application. They also can be designed to provide a zero spring rate in a limited range. To provide a substantially zero spring rate through their range of compression, the springs 28 are arranged to be compressed through the flat condition to a reverse conical condition as shown in FIGURE 2. The two conical surfaces 26 and 27 are provided so that the springs 28 can be deflected through their flat position.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A compensated spring mechanism comprising a liquid spring compressible by loads between a minimum and a maximum load coupled in series with a mechanical spring, preloaded to an intermediate load greater than said minimum load and less than said maximum load, said mechanical spring having a substantially zero spring rate at a load applied to the spring mechanism equal to the preload on the mechanical spring to compensate for change in the spring rate of the liquid spring.

2. A compensated spring mechanism comprising a liquid spring compressible by loads between a minimum load and a maximum load coupled in series with a mechanical spring having a stroke shorter than the stroke of said liquid spring, said mechanical spring being preloaded to an intermediate load greater than said minimum load and less than said maximum load, said mechanical spring having a substantially zero spring rate at a load applied to the spring mechanism equal to the preload on the mechanical spring to compensate for change in the spring rate of the liquid spring.

3. A compensated spring mechanism comprising a liquid spring having two relatively movable elements movable relative to each other in response to loads between a minimum load and a maximum load, a mechanical spring preloaded to an intermediate load greater than said minimum load and less than said maximum load, means adapted to apply forces to compress said springs, and coupling means between said springs causing them to be compressed in series in response to said forces, said mechanical spring having a substantially zero spring rate at a load applied to the spring mechanism equal to the preload on the mechanical spring to compensate for change in the spring rate of the liquid spring.

4. A compensated spring mechanism comprising a liquid spring having two relatively movable elements movable relative to each other under the influence of loads between a minimum load and a maximum load, a mechanical spring assembly having two relatively movable members, a mechanical spring in said assembly having a preload normally maintaining said assembly in an extended position with an intermediate force greater than said minimum load and less than said maximum load, said mechanical spring having a substantially zero spring rate at said intermediate force applied to the spring mechanism equal to the preload on the mechanical spring to compensate for change in the spring rate of the liquid spring, a force transmitting connection between one element and one member, a mounting portion on the other of said elements, and a mounting portion on the other of said members.

5. A compensated liquid spring for use in a predetermined temperature range comprising a pair of elements co-operating to define a chamber, the volume of which is changed by relative movement therebetween, a mechanical spring connected to one of said elements compressible by a predetermined load from a normal position to a compressed position, liquid having a co-efficient of expansion filling said chamber, changes in the temperature of said liquid from one extreme of said temperature range to the other extreme of said temperature range producing a stroke displacement between said elements substantially equal to the displacement between said normal and said compressed positions.

6. A compensated liquid spring for use in a predetermined temperature range comprising a piston and a cylinder co-operating to define a chamber the volume of which is changed by relative movement therebetween, a mechanical spring connected to said piston compressible by a predetermined load from a normal position to a compressed position, liquid having a co-efficient of expansion filling said chamber, changes in the temperature of said liquid from one extreme of said temperature range to the other extreme of said temperature range producing a stroke displacement between said elements substantially equal to the displacement between said normal and said compressed positions.

7. A compensated liquid spring for use in a predetermined temperature range comprising a pair of elements co-operating to define a chamber the volume of which is changed by relative movement therebetween, liquid having a co-efficient of expansion filling said chamber, said elements being movable relative to each other under the influence of loads between a minimum load and a maximum load, and a spring housing connected to one of said elements having two members movable from a normal position to a compressed position, a plurality of conical disc springs positioned between said surfaces, movement of said members from said normal to said compressed position deflecting said spring through a flat condition to a reverse conical condition, said members being movable from said normal to said compressed position by a substantially constant intermediate load on said conical disc springs which is greater than said minimum load and less than said maximum load to compensate for change in the spring rate of the liquid spring.

8. A compensated liquid spring for use in a predetermined temperature range comprising a pair of elements co-operating to define a chamber the volume of which is changed by relative movement therebetween, liquid having a co-efficient of expansion filling said chamber, a spring housing assembly connected to one of said elements having two members movable from a normal position to a compressed position each formed with one conical surface of a pair of opposed conical surfaces, a plurality of conical disc springs positioned between said surfaces, and movement of said members from said normal to said compressed position deflecting said spring through a flat condition to a reverse conical condition, said members being movable from said normal to said compressed position by a substantially constant intermediate load on said conical disc springs which is greater than said minimum load and less than said maximum load to compensate for change in the spring rate of the liquid spring.

9. A compensated liquid spring for use in a predetermined temperature range comprising a pair of elements co-operating to define a chamber the volume of which is changed by relative movement therebetween, liquid having a co-efficient of expansion filling said chamber, a spring housing assembly connected to one of said elements having two members movable from a normal position to a compressed position each formed with one conical surface of a pair of opposed conical surfaces, a plurality of conical disc springs positioned between said surfaces, movement of said members from said normal to said compressed position deflecting said spring through a flat condition to a reverse conical condition engaging said conical surface along their radial extent, and changes in the temperature of said liquid from one extreme of said temperature range to the other extreme of said temperature range producing a stroke displacement between said elements substantially equal to the displacement of said normal and compressed positions of said members.

References Cited in the file of this patent

UNITED STATES PATENTS

| | | |
|---|---|---|
| 2,162,719 | Hay | June 20, 1939 |
| 2,308,475 | Fawkes | Jan. 12, 1943 |
| 2,333,096 | Dowty | Nov. 2, 1943 |
| 2,482,449 | Wells | Sept. 20, 1949 |
| 2,560,005 | Shawbrook et al. | July 10, 1951 |
| 2,655,935 | Kinzbach | Oct. 20, 1953 |

FOREIGN PATENTS

| | | |
|---|---|---|
| 759,423 | Great Britain | Oct. 17, 1956 |